(12) United States Patent
Heizmann et al.

(10) Patent No.: US 6,486,926 B1
(45) Date of Patent: Nov. 26, 2002

(54) ADAPTABLE RASTER DISTORTION CORRECTION SYSTEM FOR MULTIPLE HORIZONTAL SCANNING FREQUENCIES

(75) Inventors: Friedrich Heizmann, Villingen (DE); John Barrett George, Carmel, IN (US); Gunter Gleim; Albert Runtze, both of Villingen (DE)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/408,378

(22) Filed: Sep. 29, 1999

(51) Int. Cl.[7] ................................................ H04N 3/23
(52) U.S. Cl. ..................... 348/746; 348/306; 348/307; 348/572-574; 348/555; 348/745; 348/747
(58) Field of Search ............................... 348/746, 555, 348/745, 747, 306, 307, 572, 573, 574

(56) References Cited

U.S. PATENT DOCUMENTS

| | | | | |
|---|---|---|---|---|
| 5,072,200 A | * | 12/1991 | Ranky | 333/167 |
| 5,581,357 A | * | 12/1996 | Sasaki et al. | 348/235 |
| 5,592,240 A | * | 1/1997 | Sakamoto et al. | 348/807 |
| 5,751,122 A | * | 5/1998 | Park | 315/386.16 |
| 6,128,048 A | * | 10/2000 | Cho | 348/745 |
| 6,281,951 B1 | * | 8/2001 | Carpentier et al. | 348/807 |

* cited by examiner

Primary Examiner—John W. Miller
Assistant Examiner—Annan Q Shang
(74) Attorney, Agent, or Firm—Joseph S. Tripoli; Joseph J. Laks; Harvey D. Fried

(57) ABSTRACT

A memory and a switchable digital filter supply different numbers of digital distortion correction values. The supplied distortion correction values are converted to an analog distortion correction signal. A passive, analog low pass filter for the analog distortion correction signal generates an analog deflection signal. The low pass filter is optimized only for those of the analog deflection signals having a given sample rate. A controller varies the different numbers of the supplied distortion correction values to maintain the given sample rate of the analog deflection signal for different horizontal scanning rates. The controller selectively implements respective operating modes for different horizontal scanning frequencies in which no interpolated distortion correction values are supplied or different numbers of interpolated distortion correction values are supplied.

38 Claims, 6 Drawing Sheets

ADAPTABLE RASTER DISTORTION CORRECTION SYSTEM FOR MULTIPLE HORIZONTAL SCANNING FREQUENCIES

BACKGROUND OF THE INVENTION

This invention relates to the field of raster distortion correction systems that are adaptable to a plurality of horizontal scanning frequencies.

Raster distortion correction, for example convergence and pincushion correction, is an important aspect of television performance, particularly for large direct view and projection television receivers and monitors. Projection television receivers can present a very difficult challenge to distortion correction systems due to the off-axis orientation of two of the three projection tubes and due to the need to provide separate distortion control systems for each projection tube. In projection television receivers, the green tube is usually in a central orientation. After the raster of the green tube is corrected, the rasters generated by the red and blue tubes must be corrected and converged to match the raster generated by the green tube.

Generally, distortion correction data can be stored in a digital memory, read out of memory, processed by an interpolator to provide additional correction data, converted to analog form, analog low-pass filtered and amplified for use as a convergence correction deflection signal. Each distortion correction circuit must be optimized not only for each projection tube's internal geometry and mounting orientation, as well as the screen size and screen orientation, but for the horizontal scanning frequency of the input video signal as well. The analog low-pass filter, which can form an input for a preamplifier, is a part of the circuit that can be most sensitive to differences in horizontal scanning frequency. Moreover, many receivers presenting significant distortion correction challenges are already adapted to operate at the standard horizontal scanning frequency (1 fH) and twice the standard horizontal scanning frequency (2 fH). In fact, such receivers will also need to process video signals having a horizontal scanning frequency three times (3 fH) the standard frequency.

In the case of a projection television receiver, for example, it is necessary to provide each tube with a respective distortion correction circuit appropriate for each of horizontal and vertical deflection and optimized for each horizontal scanning frequency. Such optimization requires two unique low-pass filters for each tube, for each horizontal scanning frequency. If a projection television receiver were adapted to operate at 1 fH and 2 fH, then twelve independently optimized distortion correction circuits would be required for the tubes. If a projection television receiver were adapted to operate at 1 fH, 2 fH and 3 fH, then eighteen independently optimized distortion correction circuits would be required for the tubes. Even if most of the constituent parts of each distortion correction circuit could be standardized, it would still be necessary to design and manufacture many different low-pass filters. Moreover, each tube would also require a switching circuit for automatically selecting the appropriate filter for a particular tube and deflection direction (e.g., red vertical) and a horizontal scanning frequency.

It is therefore desirable to avoid the use of costly switchable analog filters in distortion correction systems. Distortion correction system that did not require sets of switchable analog low-pass filters would be advantageous for many reasons, including simpler operation, enhanced reliability, greater flexibility in adjustment and setup, reduced manufacturing costs, reduced design costs and reduced design time.

SUMMARY OF THE INVENTION

A distortion correction system in accordance with inventive arrangements comprises: means for storing distortion correction values; a switchable digital filter for processing the distortion correction values; the digital filter being switched on and supplying the distortion correction values together with interpolated distortion correction values as an output in a first operating mode; the digital filter being switched off in a second operating mode, only the distortion correction values being supplied as the output; a digital to analog converter for converting the supplied output to an analog distortion correction signal; an analog low pass filter coupled for receiving the analog distortion correction signal in each of the operating modes and generating an analog deflection signal; means for determining a horizontal scanning frequency of an input video signal; and, control means responsive to the determining means for selecting one of the operating modes for different horizontal scanning rates.

A further distortion correction system in accordance with inventive arrangements comprises: means for storing distortion correction values; a digital filter for processing the distortion correction values; the digital filter supplying the distortion correction values together with a first number of interpolated distortion correction values in a first operating mode; the digital filter supplying the distortion correction values together with a second number of interpolated distortion correction values in a second operating mode; a digital to analog converter for converting the supplied distortion correction values to an analog distortion correction signal; an analog low pass filter coupled for receiving the analog distortion correction signal in each of the operating modes and generating an analog deflection signal; means for determining a horizontal scanning frequency of an input video signal; and, control means responsive to the determining means for selecting one of the operating modes for different horizontal scanning rates.

The digital filter can be advantageously switched off in a third operating mode such that only the distortion correction values is supplied as an output to the digital to analog converter. In this case, the determining means advantageously selects the first operating mode when a first horizontal scanning frequency is identified, selects the second operating mode when a second horizontal scanning frequency faster than the first horizontal scanning frequency is identified and selects the third operating mode when a third horizontal scanning frequency is identified faster than the second horizontal scanning frequency.

Yet another distortion correction system in accordance with inventive arrangements comprises: means for supplying different numbers of digital distortion correction values; a digital to analog converter for converting the supplied distortion correction values to an analog distortion correction signal; an analog low pass filter coupled for receiving the analog distortion correction signal and generating an analog deflection signal, the low pass filter being optimized only for those of the analog deflection signals having a given sample rate; means for determining a horizontal scanning frequency of an input video signal; and, control means responsive to the determining means for varying the different numbers of the supplied distortion correction values to maintain the given sample rate of the analog deflection signal for different horizontal scanning rates.

A method for distortion correction in accordance with inventive arrangements comprises the steps of: storing digital distortion correction values; digitally filtering the digital distortion correction values in a first mode of operation to generate interpolated distortion correction values; supplying as an output the distortion correction values together with the interpolated distortion correction values in the first mode of operation; supplying only the distortion correction values as the output in a second mode of operation; converting the supplied output to an analog distortion correction signal; low pass filtering the analog distortion correction signal in each of the operating modes with the same passive analog filter, for generating an analog deflection signal; determining a horizontal scanning frequency of an input video signal; and, responsive to the determining step, selecting one of the operating modes for different horizontal scanning frequencies.

A further method for distortion correction in accordance with inventive arrangements comprises the steps of: storing digital distortion correction values; digitally filtering the digital distortion correction values in a first mode of operation to generate a first number of interpolated distortion correction values; supplying as an output the distortion correction values together with the first number of interpolated distortion correction values in the first mode of operation; digitally filtering the digital distortion correction values in a second mode of operation to generate a second number of interpolated distortion correction values; supplying as the output the distortion correction values together with the second number of interpolated distortion correction values in the second mode of operation; converting the supplied output to an analog distortion correction signal; low pass filtering the analog distortion correction signal in each of the operating modes with the same passive analog filter for generating an analog deflection signal; determining a horizontal scanning frequency of an input video signal; and, responsive to the determining step, selecting one of the operating modes for different horizontal scanning frequencies.

The method can advantageously comprise the step of supplying only the distortion correction values as the output in a third operating mode. In this case, the method can advantageously comprise the step of selecting the first operating mode when a first horizontal scanning frequency is identified, selecting the second operating mode when a second horizontal scanning frequency is identified faster than the first horizontal scanning frequency and selecting the third operating mode when a third horizontal scanning frequency is identified faster than the second horizontal scanning frequency.

Yet another method for distortion correction comprises the steps of: supplying different numbers of digital distortion correction values; converting the supplied digital distortion correction values to an analog distortion correction signal; analog low pass filtering the analog distortion correction signal with a characteristic response optimized only for those of the analog deflection signals having a given sample rate; determining a horizontal scanning frequency of an input video signal; and, varying the different numbers of the supplied distortion correction values to maintain the given sample rate of the analog deflection signal for different horizontal scanning rates.

The inventive arrangements advantageously enable the same analog low pass filter, in particular a passive filter, to be used in a distortion correction system for a plurality of horizontal scanning frequencies including, for example, 1 fH, 2 fH and 3 fH. The use of a switchable, programmable digital filter, for example a finite impulse response filter with a selectable number of input taps, advantageously enables the nature and quantity of convergence correction values ultimately supplied to the low pass filter to be different for different horizontal scanning frequencies. The distortion values are advantageously controlled by selecting the number of interpolated values supplied with the original values as an output, and in one advantageous embodiment, by turning off the digital filter and supplying only original correction values. The switchable digital filter with selectable output values can be advantageously embodied in an integrated circuit, alone or bundled with other related functions.

The inventive arrangements take advantage of the realization that a critical factor in operation and optimization of the low pass filter resides in maintaining a constant or at least substantially constant sample rate in the signal being low pass filtered. The number of correction values supplied to generate the correction signal can be advantageously varied to maintain the same sample rate for different horizontal scanning frequencies. In particular, the number of interpolated values generated and supplied together with original values can be advantageously varied in accordance with inventive arrangements.

DETAILED DESCRIPTION OF THE PREFERRED EMBODIMENTS

Distortion correction is often based on digital stored correction data (i.e., values or samples) for the horizontal and vertical direction, as well as for the three colors RGB. The distortion correction values are associated with respective points of intersection of a grid defined over the picture screen. These data are used to generate correction currents for driving correction deflection coils by means of digital to analog (D/A) converters and succeeding amplifiers.

It should be noted that the correction current at the end of a horizontal scanning line usually has a completely different value than at the beginning of the line. Accordingly, additional grid points are provided in the non-visible horizontal retrace to more smoothly bring the current its value at the end of the scanning line to the value at the beginning of the next scanning line. In the presently preferred embodiment, 14 grid points are provided in the visible portion of the scanning line and 2 grid points are provided during the retrace portion of the scanning line. Each grid point corresponds to an original distortion correction value.

In order to obtain as faultless a picture as possible, the deflection beam must be corrected at every point in time or at every location on the screen. The information that is required for this purpose has to be obtained from the stored data. In addition, the wave-shape of the correction currents should be as smooth as possible.

Figure 1:
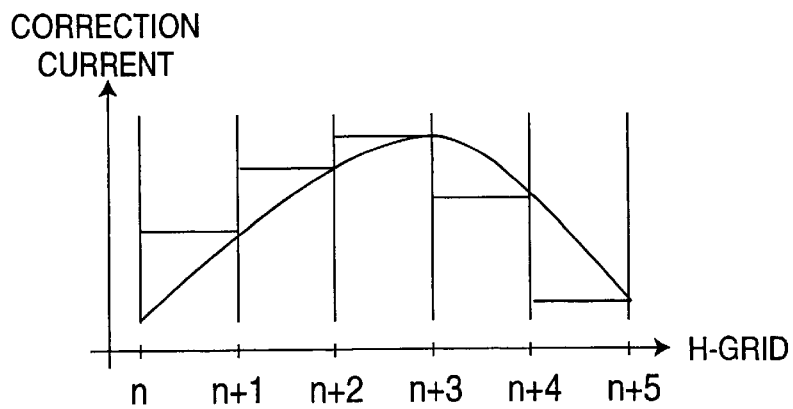
FIG. 1 is a graph useful for explaining the distortion correction signal present at the output of a digital to analog converter and the corresponding output of a passive low pass filter optimized for operation at 3 fH and operated at 3 fH.

The distortion correction values for vertical distortion correction between the grid points, that is for correcting distortion of the horizontal lines vertically between the grid points, are determined by an interpolation algorithm. In the horizontal direction the desired smooth current can be generated by the external filtering of the correction values sequentially supplied as discrete output values in time by an interpolator, which can be embodied in an integrated circuit. The D/A converter supplies as outputs for the grid points a specific correction value, and maintains this value until the next grid point. From these values the filter subsequently generates the desired smooth current curve. The filter comprises, as a general rule, a passive analog low pass filter often formed as part of the input circuit in a preamplifier or amplifier, the low pass filter receiving the output of the D/A converter, the inductance of the correction coil and the limited bandwidth of the output amplifier. FIG. 1 illustrates the trace of the staircase-like correction signal 10 that is present at the output of a D/A converter and the correction current 12 obtained therefrom with the aid of the filtering.

The time constant of the total system (filter, correction coil, amplifier) must be tuned to the frequency of the data from the D/A converter and thus to the horizontal frequency of the input video signal. Projection television receivers are increasingly designed to be multi-standard devices, which support, for example, different horizontal scanning frequencies and different VGA display standards. Such a multi-standard device must be able to produce properly converged pictures over a range of horizontal deflection frequencies from approximately 15 KHz to approximately 50 KHz.

Figure 2:
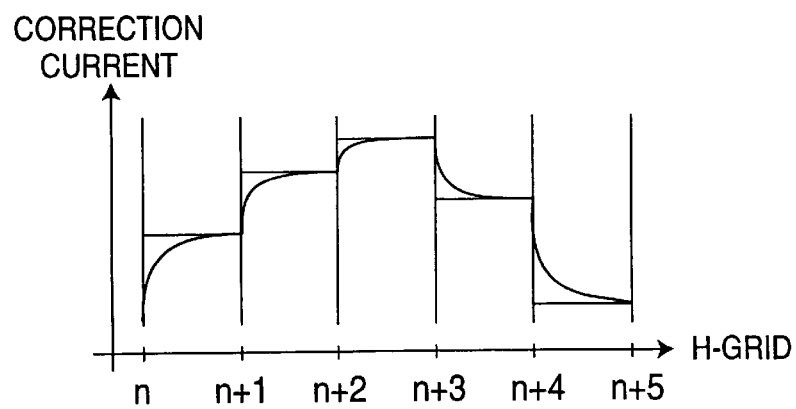
FIG. 2 is a graph useful for explaining the distortion correction signal present at the output of a digital to analog converter and the corresponding output of the same passive low pass filter optimized for operation at 3 fH as shown in FIG. 1, but operated at 1 fH.

However, if a system optimized to 50 KHz (3.2 fH) were to be operated with a 1 fH source (that is, a normal television picture with an approximately 16 KHz horizontal frequency), the same staircase-like correction signal 10 shown in FIG. 1 would result in the deflection current 14 shown in FIG. 2. Deflection current is not at all smooth; the slope has numerous discontinuities. This would lead to a disturbing vertical striated pattern on the screen. Conversely, a system optimized to operate at lfH would not be able to adequately track and smooth the rapid signal changes at relatively high horizontal frequencies, for example 2 fH and 3 fH.

The poor correction deflection current 14 shown in FIG. 2 can be corrected in accordance with prior art techniques by switching a different low pass filter into the circuit. The different low pass filter would be designed to optimize the overall filter response for a 1 fH or 2 fH horizontal scanning frequency. However, this technique requires relatively high expenditures and is design-intensive, since as noted, six channels are affected, namely each of RBG for both horizontal and vertical distortion correction. Therefore, it would be necessary to initially design and test, and thereafter, switch between six filters. The switching is complicated by the requirement to implement switching as a function of the range of the supported horizontal frequencies, potentially in several stages, which further increases the complexity and thus the cost of the system. Moreover, such a complex system is likely to be inherently less reliable. In any event, such a system will be more difficult to trouble-shoot and fix should that become necessary.

In accordance with inventive arrangements, the same low pass filter optimized for one of the horizontal scanning frequencies, for example the highest horizontal scanning frequency in the required range, is advantageously used for all horizontal scanning frequencies. Instead, the operation of the digital filter, for example a finite impulse response filter, is advantageously switched on and off and operated in different modes for the different horizontal scanning frequencies in the required range. Advantageously, such digital switching can be very easy to implement as compared to a switching network of low pass filters, particularly if the interpolator is embodied in an integrated circuit. Interpolation filters in accordance with inventive arrangements are preferably implemented in an integrated circuit and can not only be switched on and off, but when switched on, can be flexibly adapted to different operating modes corresponding to different horizontal scanning rates. The different operating modes can advantageously correspond to use of the same digital filter with a different number of input taps, for generating different numbers of interpolated distortion correction values. The inventive arrangements are so effective that the external analog filter can advantageously be implemented as a simple, passive resistive-capacitive (RC) filter.

In accordance with inventive arrangements, a range of horizontal scanning frequencies including 1 fH, 2 fH and 3 fH, and frequencies close to one or more of these values, for example 3.2 fH, requires at least three operating modes for the digital filter. Other proposed ranges can require a greater or lesser number of operating modes. In the first operating mode, the digital filter is switched off. The output is only the original distortion correction values (see output 10 in FIG. 1). The external RC filter is optimized for operation at the highest end of the required frequency range, for example 3 fH and 3.2 fH. At such high horizontal frequencies the external RC filter in connection with the inductor of the correction coil is sufficient as a filter and will produce a smooth distortion deflection current 12 as shown in FIG. 1.

Figure 3:
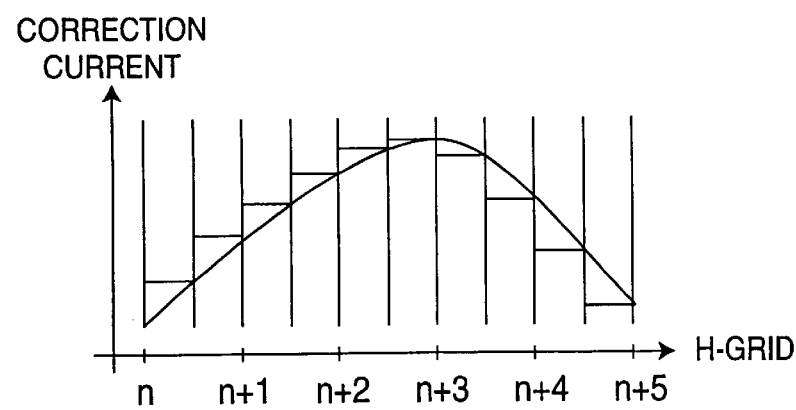
FIG. 3 is a graph useful for explaining the distortion correction signal present at the output of a digital to analog converter and the corresponding output of the same passive low pass filter optimized for operation at 3 fH as shown in FIG. 1 but operated at 2 fH, and wherein the distortion correction signal includes an additional interpolated correction value between each original correction value.

The digital filter is switched on in the second operating mode. The digital filter is operated as a 3-tap FIR filter, that is, one having three input taps. The inputs to the taps are the original distortion correction values. A 3-tap FIR filter will generate one interpolated distortion correction value spatially between each original distortion correction value. The output of the interpolator is the stair step waveform 16 shown in FIG. 3. This operating mode is intended for a lower horizontal scanning frequency, for example 2 fH. In accordance with inventive arrangements, it has been determined that operation at a lower frequency than the optimized frequency, but with a larger number of correction values, both original and interpolated, will also result in the smooth distortion deflection current 18 shown in FIG. 3.

Figure 4:
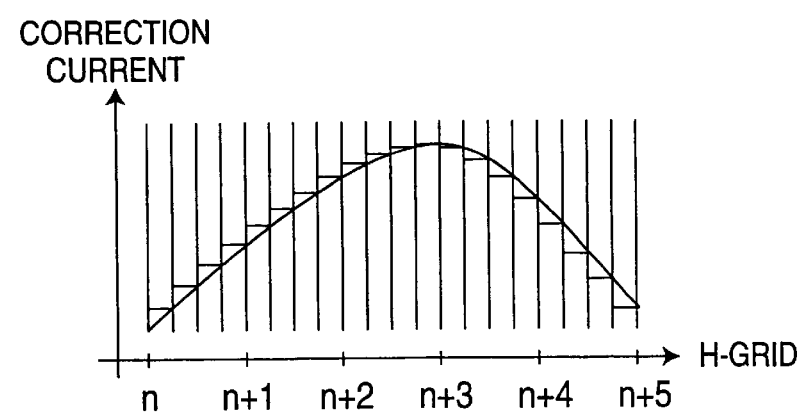
FIG. 4 is a graph useful for explaining the distortion correction signal present at the output of a digital to analog converter and the corresponding output of the same passive low pass filter optimized for operation at 3 fH as shown in FIG. 1 but operated at 1 fH, and wherein the distortion correction signal includes three additional interpolated correction values between each original correction value.

The digital filter is also switched on in the third operating mode. The digital filter is operated as a 5-tap FIR filter, that is, one having five input taps. The inputs to the taps are the original distortion correction values. A 5-tap FIR filter will generate three interpolated distortion correction values spaced spatially between each original distortion correction value. The output of the interpolator is the stair step waveform 20 shown in FIG. 4. This operating mode is intended for the lower end. of the proposed horizontal scanning frequency range, for example 1 fH. In accordance with inventive arrangements, it has been determined that operation at a still lower frequency than the optimized frequency, but with a still larger number of correction values, both original and interpolated, will also result in the smooth distortion deflection current 22 shown in FIG. 4.

It will be appreciated that a receiver operating at 2 fH and 3 fH, for example, might require only the first and second operating modes. A receiver operating at 1 fH and 1 fH, for example, might require only the second and third operating modes. A receiver operating at 1 fH and 3 fH, for example, might require only the first and third operating modes.

The digital filter can be advantageously switched off during times other than horizontal trace in the first operating mode, corresponding for example to operation at 3 fH. Switching off the digital filter during the horizontal retrace can be particularly useful, for example, if the device operates with high horizontal frequency and very short retrace times. The frequency of the digital filter, and thus also the frequency of the D/A converters, is very high during the return trace under this operating condition. This can lead to exceeding the permissible maximum frequency of the D/A converters. Even if the maximum frequency of the D/A converters is not exceeded, the D/A converters can be a source of a large transient that can disturb proper operation of the digital filter at the beginning of horizontal trace. This is a special concern for a FIR filter which relies on earlier samples to generate output values. Switching off the filters during the horizontal retrace can advantageously prevent this transient form occurring and can advantageously prevent exceeding the permissible maximum frequency of the D/A converters.

Figure 8:
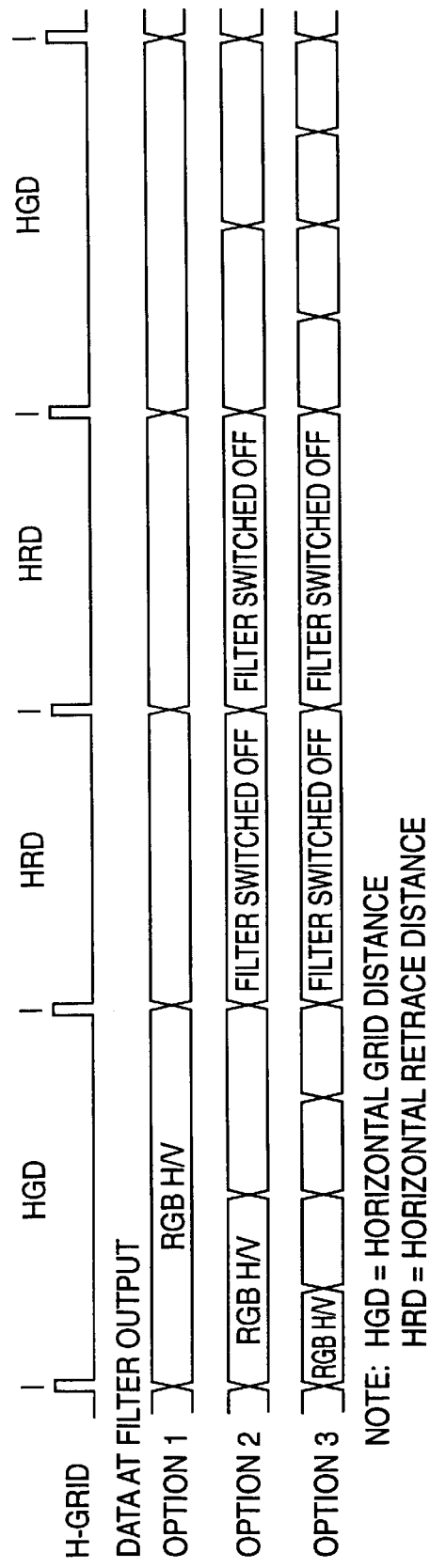
FIG. 8 is a diagram useful for explaining how the first stage interpolator can be switched off during horizontal retrace.

Calculation of the filter values can, in fact, continue during horizontal retrace so that when the digital filter is switched on again no disturbing filter build-up occurs. During the switching off in the retrace, the data values are switched from the interpolation, as is the case when the digital filter is completely switched off in the first operating mode, and supplied directly to the D/A converters. FIG. 8 shows the output of data at the digital filter output for this mode of operation.

An operating environment including horizontal scanning at frequencies of 3 fH or more can require special processing of horizontal scanning to facilitate operation. One such special processing is the capacity to independently program and control the length of time of the horizontal return trace independently of the length of time of the horizontal trace. Two programmable parameters re required. A parameter denoted HGD (horizontal grid distance) determines the number of system clocks for a grid width in the visible portion of the line, 14 grid points in this embodiment. A parameter denoted HRD (horizontal retrace distance) determines the number of system clocks for a grid width in the non-visible portion of the line, 2 grid points in this embodiment.

Figure 5:
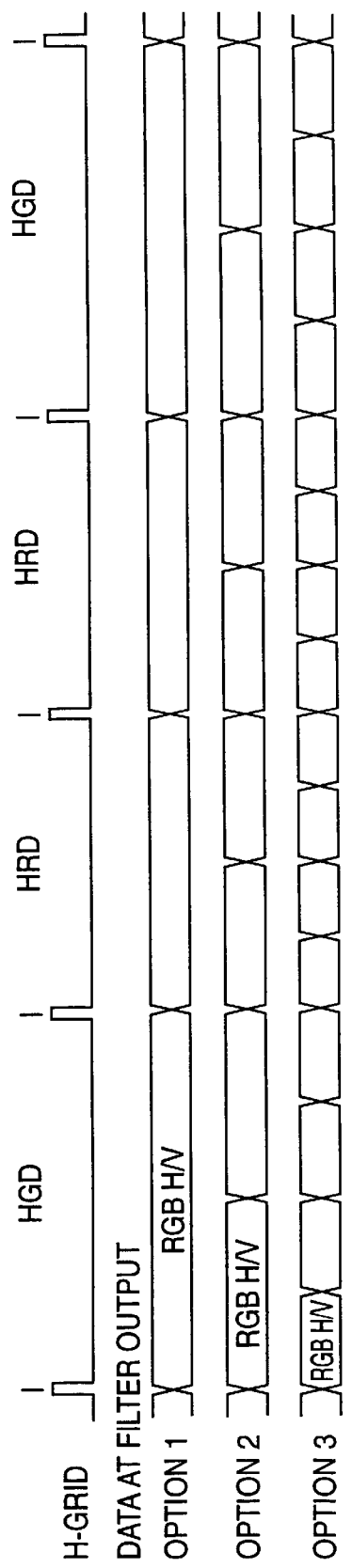
FIG. 5 is a diagram useful for explaining operation of the distortion correction system in conjunction with a system for independently programming the lengths of horizontal trace and retrace.

FIG. 5 shows the conditions at the D/A converter output for all three operating mode. Since HGD and HRD need to be programmable over a wide range independently of one another, and the supporting points generated by the filters should lie symmetrically within a grid time, the filter clock must also be generated corresponding to the particular programming of HGD or HRD. Consequently, the filter operates at two different frequencies during the sweep and during the return race.

Figure 6:
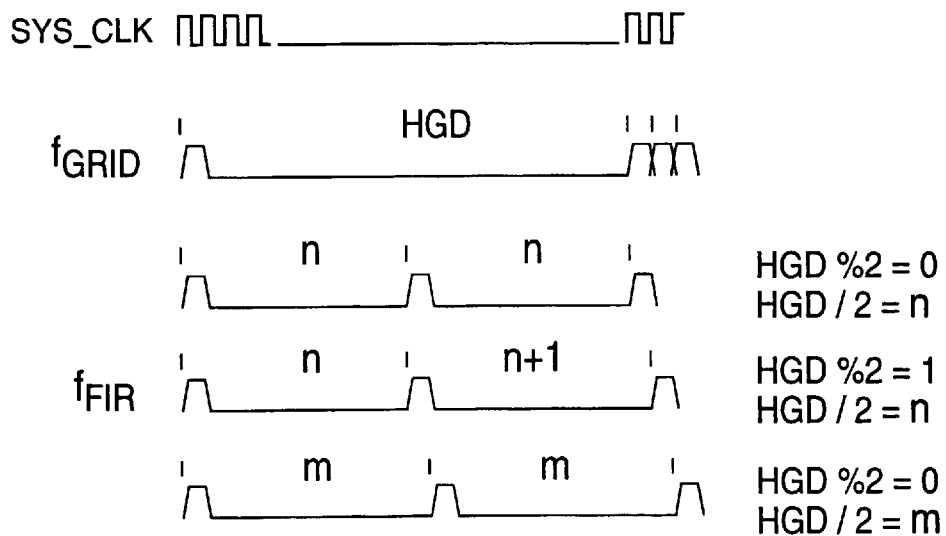
FIGS. 6 and 7 are diagrams useful for explaining the distribution of clock pulses for the selectable outputs of the first interpolating stage.
Figure 7:
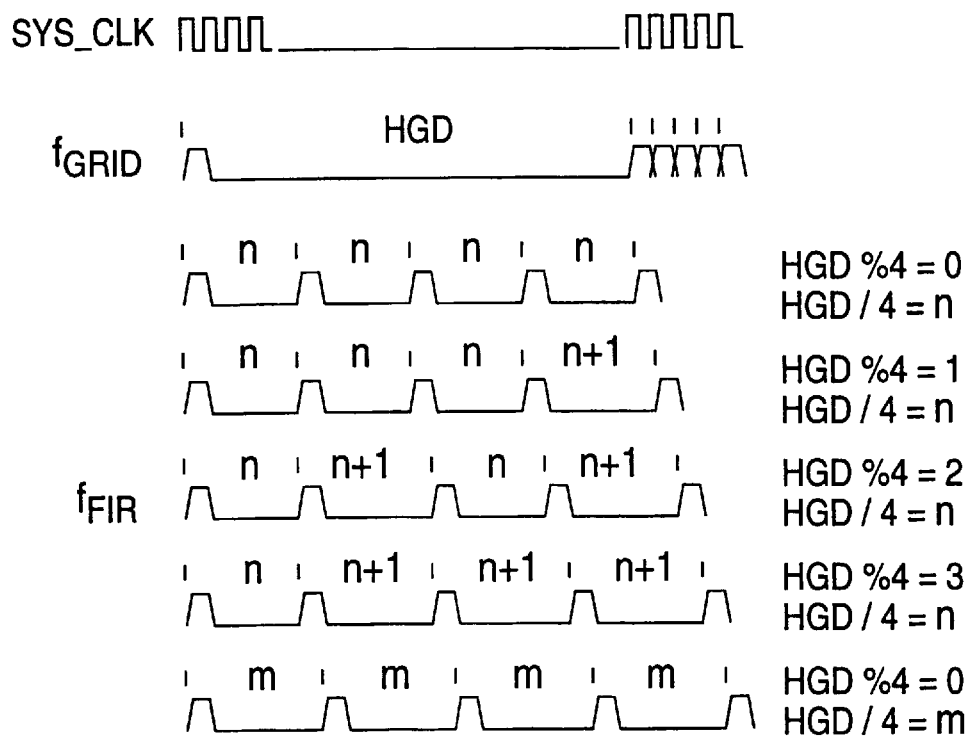

Since HGD and HRD are not always integrally divisible by 2 (second operating mode using a 3-tap filter for 2 fH scanning) or 4 (third operating mode using a 5-tap filter for 1 fH scanning), the supernumerary clocks must be distributed over the sampling intervals of the filter. This is very simple for the case of second operating mode (2 sampling intervals per grid). In the third operating mode (4 sampling intervals per grid) as uniform as possible a distribution was observed. FIGS. 6 and 7 depict the distribution of the clocks over the sampling intervals for the second and third operating modes respectively. In these Figures, $sys_{13}$ clk is a system clock, for example a system clock in an integrated circuit in which the digital filter is embodied. $f_{GRID}$ is a clock for the grid derived from the system clock. $f_{FIR}$ is a clock for the filter derived also derived form the system clock.

The procedure illustrated by FIGS. 6 and 7 for the horizontal sweep (HGD) is corresponding also applied in the horizontal retrace. To this end only the parameter HGD must be replaced in the Figures by the parameter HRD.

Figure 9:
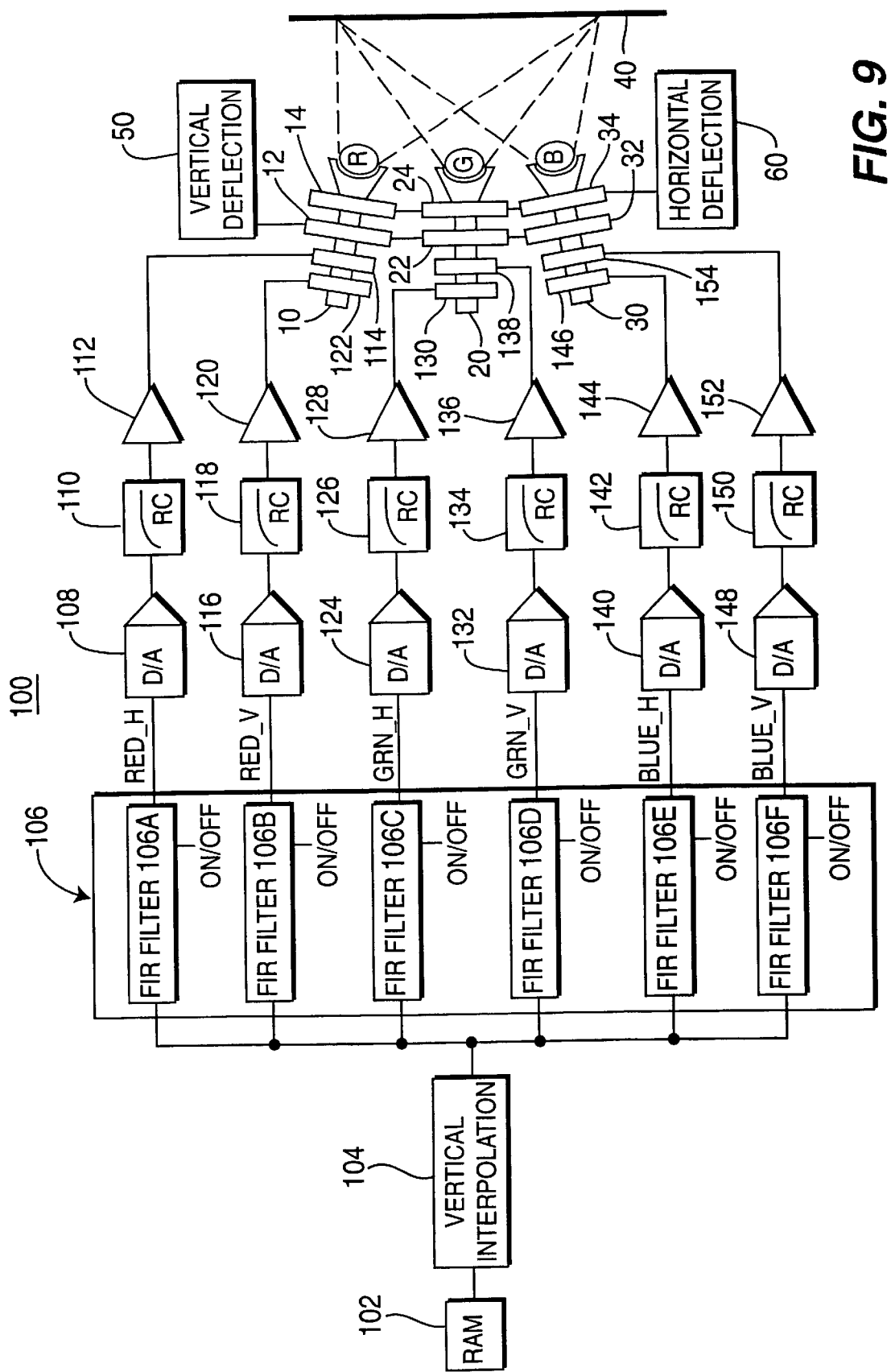
FIG. 9 is a block diagram of a distortion control system in accordance with inventive arrangements.

A complete distortion correction system 100 for a projection television receiver is shown in FIG. 9. The receiver has three projection tubes for each of red (R), green (G) and blue (B) colors. The green tube 20 is axially aligned with a projection screen 10, and accordingly, does not usually require distortion correction. The rasters generated by the red and blue tubes are converged to the raster generated by the green tube. The red tube 10 is provided with a vertical deflection coil 12, a horizontal deflection coil 14, an auxiliary horizontal deflection coil 114 and an auxiliary vertical deflection coil 124. The green tube 20 is provided with a-vertical deflection coil 22, a horizontal deflection coil 24, an auxiliary horizontal deflection coil and an auxiliary vertical deflection coil. The auxiliary deflection coils of the green tube are not provided with reference numerals as they play no part in distortion correction in the illustrated embodiment. An auxiliary deflection coil can be used for another purpose, for example scan velocity modulation. The blue tube 30 is provided with a vertical deflection coil 32, a horizontal deflection coil 34, an auxiliary horizontal deflection coil 132 and an auxiliary vertical deflection coil 140. The vertical deflection coils are driven by a vertical deflection signal generated by a vertical deflection circuit 50. The horizontal deflection coils are driven by a horizontal deflection signal generated by a horizontal deflection circuit 60. The auxiliary deflection coils of the red and blue tubes are driven by distortion correction deflection signals.

Generation of the distortion correction deflection signals begins with a set of distortion correction values, referred to herein as original distortion correction values, as distinguished from interpolated distortion correction values generated by the switchable digital filter. The original distortion correction values are stored in a random access memory (RAM). The original distortion correction values represent correction data at the points of a grid defined on the projection screen, as explained above. A vertical interpolation circuit provides sets of distortion correction values for each horizontal line of the grid and vertically interpolated distortion correction values for horizontal lines vertically between the grid points. For purposes of definition, even though the output of the vertical interpolator includes both original distortion correction values and vertically interpolated distortion correction values, all of the values output by the vertical interpolator are deemed to be original distortion correction values for purposes of horizontal interpolation. This is the definition that is applied in the specification and in the claims.

A distortion correction system 100 shown in FIG. 9 comprises a RAM 102 for storing distortion correction values for a grid of points. A vertical interpolator 104 provides original distortion correction values as an output supplied to a switchable digital filter 106. Digital filter 106 comprises a plurality of switchable and programmable FIR filters 106A, 106B, 106C, 106D, 106E and 106F, for providing distortion correction data for red horizontal (RED__H), red vertical (RED__V), green horizontal (GRN__H), green vertical (GRN__V), blue horizontal (BLUE__H) and blue vertical (BLUE__V) respectively. Each of these correction signals can be thought of as being generated by or representing a channel. In a projection television receiver, the correction signals will often be composite signals directed to the correction of different kinds of distortions. The green correction signals will not usually be formulated for convergence correction, but for example will be directed to vertical pincushion correction. The red and blue correction signals will usually be formatted for convergence correction, but these signals can be formulated for correcting other distortions as well.

The output of FIR filter 106A is converted to analog form by D/A converter 108. A passive, low pass resistive-capacitive (RC) filter 108 smoothes the analog signal. The low pass filtered signal is amplified by amplifier 112, which represents a preamplifier or an amplifier or both. The RC filter can be formed as part of an input network associated with a preamplifier. The filtered, smoothed signal drives an auxiliary distortion correction deflection coil 114 of projection tube 10.

The output of FIR filter 106B is converted to analog form by D/A converter 116. A passive, low pass resistive-capacitive (RC) filter 118 smoothes the analog signal. The low pass filtered signal is amplified by amplifier 120, which represents a preamplifier or an amplifier or both. The RC filter can be formed as part of an input network associated with a preamplifier. The filtered, smoothed signal drives an auxiliary distortion correction deflection coil 124 of projection tube 10.

The output of FIR filter 106C is converted to analog form by D/A converter 124. A passive, low pass resistive-capacitive (RC) filter 126 smoothes the analog signal. The low pass filtered signal is amplified by amplifier 128, which represents a preamplifier or an amplifier or both. The RC filter can be formed as part of an input network associated with a preamplifier. The filtered, smoothed signal drives an auxiliary distortion correction deflection coil 130 of projection tube 20.

The output of FIR filter 106D is converted to analog form by D/A converter 132. A passive, low pass resistive-capacitive (RC) filter 134 smoothes the analog signal. The low pass filtered signal is amplified by amplifier 136, which represents a preamplifier or an amplifier or both. The RC filter can be formed as part of an input network associated with a preamplifier. The filtered, smoothed signal drives an auxiliary distortion correction deflection coil 138 of projection tube 20.

The output of FIR filter 106E is converted to analog form by D/A converter 140. A passive, low pass resistive-capacitive (RC) filter 142 smoothes the analog signal. The low pass filtered signal is amplified by amplifier 144, which represents a preamplifier or an amplifier or both. The RC filter can be formed as part of an input network associated with a preamplifier. The filtered, smoothed signal drives an auxiliary distortion correction deflection coil 146 of projection tube 30.

The output of FIR filter 106F is converted to analog form by D/A converter 148. A passive, low pass resistive-capacitive (RC) filter 150 smoothes the analog signal. The low pass filtered signal is amplified by amplifier 152, which represents a preamplifier or an amplifier or both. The RC filter can be formed as part of an input network associated with a preamplifier. The filtered, smoothed signal drives an auxiliary distortion correction deflection coil 154 of projection tube 30.

Figure 10:
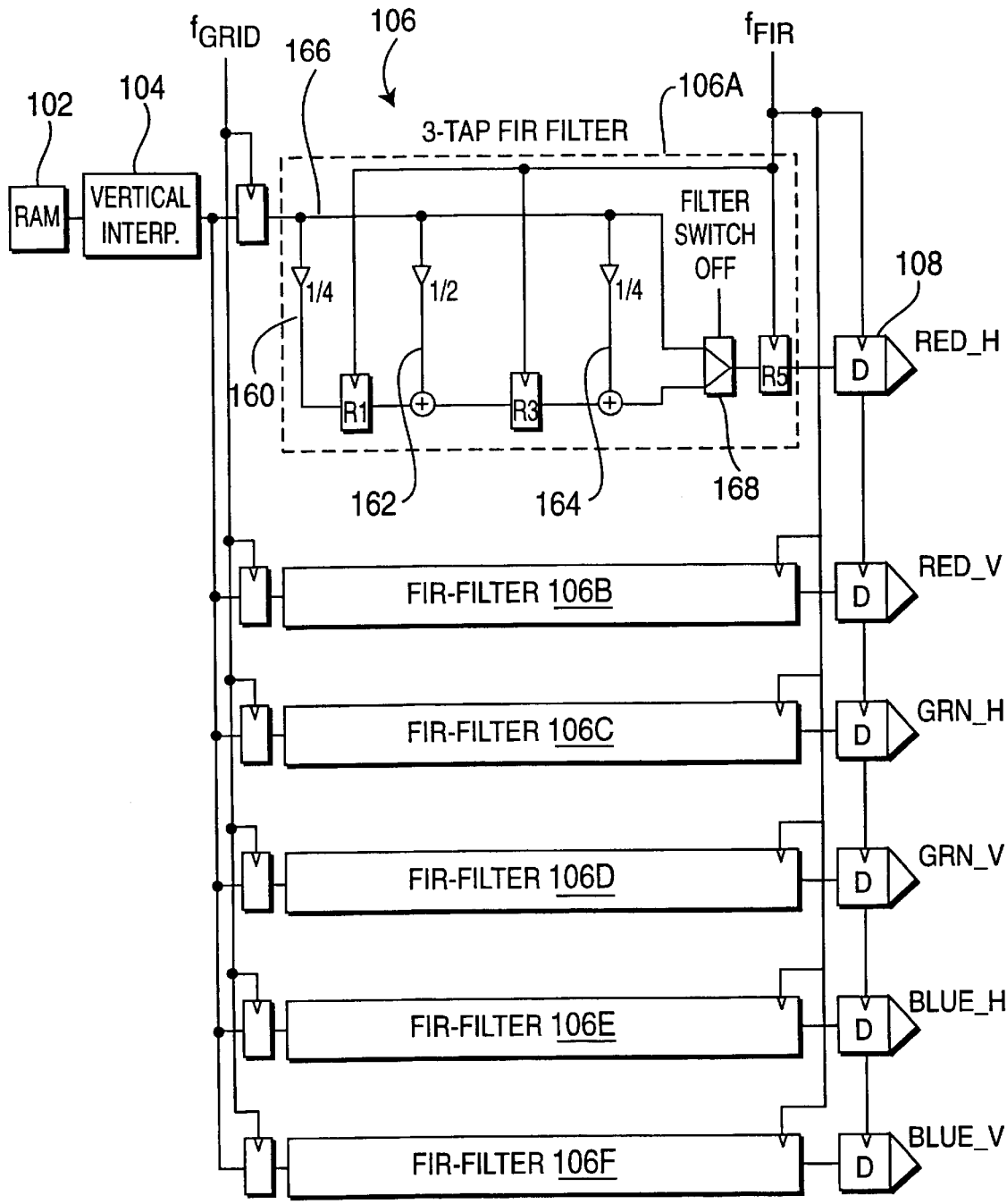
FIG. 10 is a block diagram showing the structure of the FIR filter of FIG. 9 as programmed for three input taps.
Figure 11:
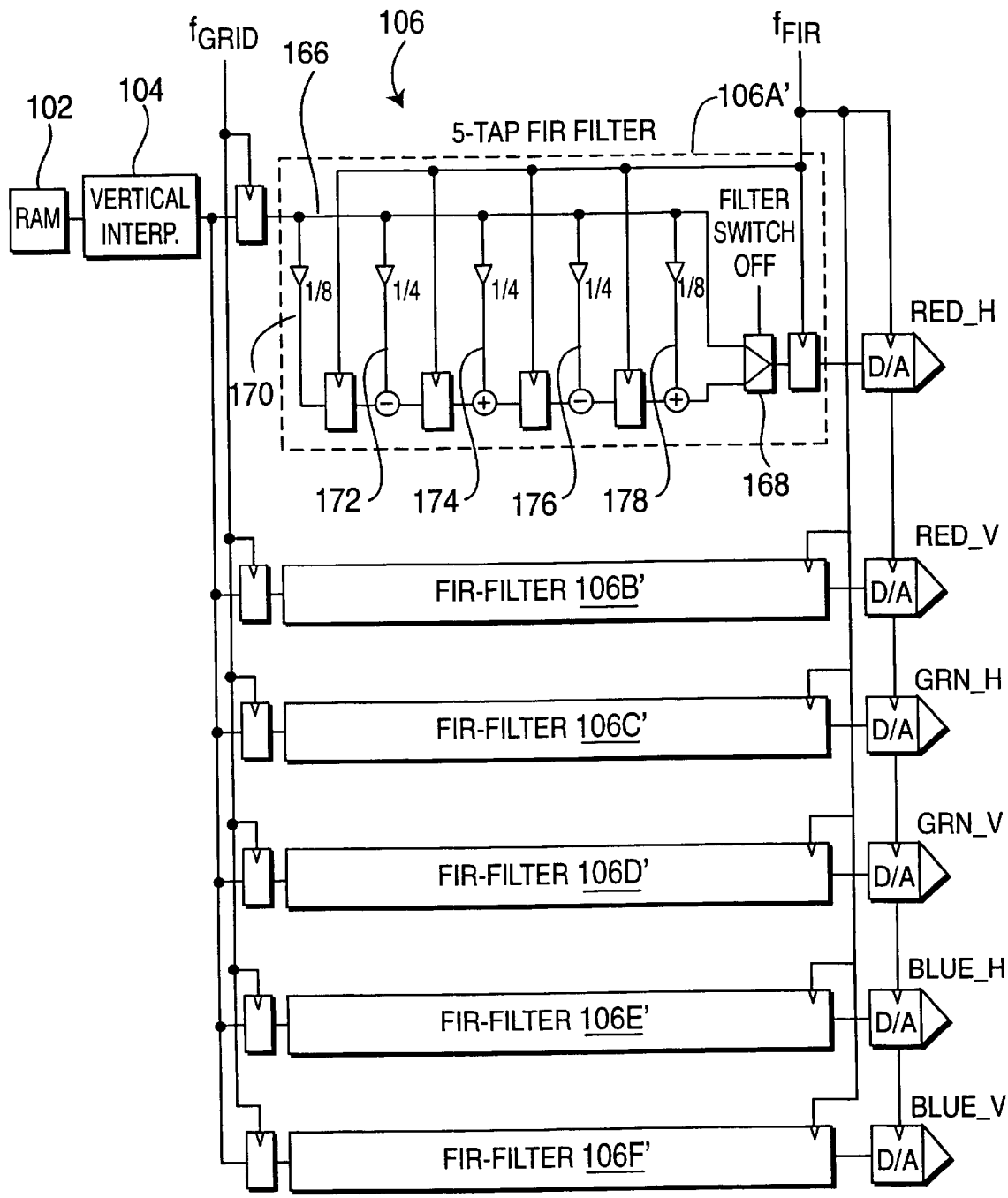
FIG. 11 is a block diagram showing the structure of the FIR filter of FIG. 9 as programmed for five input taps.

In a system adapted to operate in a range of horizontal scanning frequencies, for example from 1 fH to 3 fH, the low pass RC filters are optimized for operation at 3 fH. FIGS. 10 and 11 show the fundamental architecture of the digital FIR filters. Although there needs to be only one programmable digital filter, for example embodied in an integrated circuit, the 3-tap filter arrangement and the 5-tap filter arrangement are shown separately in FIGS. 10 and 11 respectively for purposes of clarity.

With reference to FIG. 10, the digital filter 106 comprises six programmable FIR filters 106A, 106B, 106C, 106D, 106E and 106F. Only the details of FIR filter 106A are shown and identified by reference numerals for purposes of clarity. The other FIR filters have the same configuration. Original distortion correction values are inputs to each of the filters 106A, 106B, 106C, 106D, 106E and 106F.

Filter 106A if a digital FIR filter having 3-taps 160, 162 and 164. The taps are weighted $1/4$, $1/2$ and $1/4$ respectively. Original distortion correction values are propagated along path 166. The values form inputs to the taps as they propagate along path 160. The interleaving occurs in switch 168, by means of which the FIR filter can be effectively switched off. In the 3-tap configuration, one interpolated distortion correction value is generated and interleaved between each original distortion correction value. The fGRID clock controls propagation of the original distortion correction values along the path 168. The fFIR clock controls propagation of the interpolated distortion correction values and the interleaved output values of the filter.

The digital filter 100 as shown in FIG. 10 differs from that shown in FIG. 9 in that the FIR filters are programmed as 5-tap FIR filters 106A', 106B', 106C', 106D', 106E' and 106F'. Only the details of FIR filter 106A' are shown and identified by reference numerals for purposes of clarity.

Filter 106A' is a digital FIR filter having 5-taps 170, 172, 174, 176 and 178. The taps are weighted $1/8$, $1/4$, $1/4$, $1/4$ and $1/8$ respectively. Original distortion correction values are propagated along path 166. The values form inputs to the taps as they propagate along path 160. The interleaving occurs in switch 168, by means of which the FIR filter can be effectively switched off. In the 5-tap configuration, three interpolated distortion correction values are generated and interleaved between each original distortion correction value. The fGRID clock controls propagation of the original distortion correction values along the path 168. The fFIR clock controls propagation of the interpolated distortion correction values and the interleaved output values of the filter.

Generating different numbers of correction values, and in particular different numbers of interpolated correction values, advantageously make it possible to vary the number of samples supplied by the interpolator to maintain a substantially constant sample rate for the correction signal processed by the low pass filter for different horizontal scanning rates. In the presently preferred embodiment, the low pass filter is optimized for the sample rate associated with 3 fH horizontal scanning. At the 3 fH scanning rate only the original correction values are supplied. No interpolated values are generated. As the scanning rate decreases, more correction values must be generated and supplied in order to maintain the same sample rate through the low pas filter as in 3 fH scanning. A scanning rate of 2 fH requires one interpolated value between each original value. A scanning rate of 1 fH requires three interpolated values between each original value. The low pass filter is thus optimal for all three horizontal scanning rates because the sample rate can be automatically varied.

As a result of the inventive arrangements, each channel of a multiple channel distortion correction system capable of automatically adapting to multiple horizontal scanning frequencies can be provided with a passive low pass filter optimized for only one of the horizontal scanning frequencies. A complex and expensive network of switched filters, each optimized for a different horizontal scanning frequency is unnecessary.

It will be appreciated that all six channels of the distortion correction signals shown in FIG. 9 may not be necessary in all cases for all receivers, depending upon the geometric configuration of the projection tubes and screen in the receiver. It will also be appreciated that the inventive arrangements are applicable to direct view television receivers and monitors, particularly those with large screens or wide deflection angles.

What is claimed is:

1. A distortion correction system, comprising:
   means for storing distortion correction values;
   a switchable digital filter for processing said distortion correction values;
   said digital filter being switched on and supplying said distortion correction values together with interpolated distortion correction values as an output in a first operating mode;
   said digital filter being switched off in a second operating mode, only said distortion correction values being supplied as said output;
   a digital to analog converter for converting said supplied output to an analog distortion correction signal;
   an analog low pass filter coupled for receiving said analog distortion correction signal in each of said operating modes and generating an analog deflection signal;
   means for determining a horizontal scanning frequency of an input video signal; and,
   control means responsive to said determining means for selecting one of said operating modes for different horizontal scanning rates.

2. The system of claim 1, wherein said digital filter comprises a finite impulse response filter (FIR).

3. The system of claim 1, wherein said determining means selects said first operating mode when a first horizontal scanning frequency is identified and selects said second operating mode when a second horizontal scanning frequency faster than said first horizontal scanning frequency is identified.

4. The system of claim 1, wherein said analog filter comprises a passive filter.

5. A distortion correction system, comprising:
   means for storing distortion correction values;
   a digital filter for processing said distortion correction values;
   said digital filter supplying said distortion correction values together with a first number of interpolated distortion correction values in a first operating mode;
   said digital filter supplying said distortion correction values together with a second number of interpolated distortion correction values in a second operating mode;
   a digital to analog converter for converting said supplied distortion correction values to an analog distortion correction signal;
   an analog low pass filter coupled for receiving said analog distortion correction signal in each of said operating modes and generating an analog deflection signal;
   means for determining a horizontal scanning frequency of an input video signal; and,
   control means responsive to said determining means for selecting one of said operating modes for different horizontal scanning rates.

6. The system of claim 5, wherein said first number of interpolated values in said first operating mode is larger than said second number of interpolated values in said second operating mode.

7. The system of claim 6, wherein said determining means selects said first operating mode when a first horizontal scanning frequency is identified and selects said second operating mode when a second horizontal scanning frequency faster than said first horizontal scanning frequency is identified.

8. The system of claim 5, wherein said analog filter comprises a passive filter.

9. The system of claim 5, wherein said digital filter comprises a finite impulse response (FIR) filter selectively operable with more input taps in said first operating mode than in said second operating mode.

10. The system of claim 5, wherein said digital filter is switched off in a third operating mode and only said distortion correction values is supplied as an output to said digital to analog converter.

11. The system of claim 10, wherein said first number of interpolated values in said first operating mode is larger than said second number of interpolated values in said second operating mode.

12. The system of claim 11, wherein said determining means selects said first operating mode when a first horizontal scanning frequency is identified, selects said second operating mode when a second horizontal scanning frequency faster than said first horizontal scanning frequency is identified and selects said third operating mode when a third horizontal scanning frequency is identified faster than said second horizontal scanning frequency.

13. The system of claim 12, wherein said first horizontal scanning frequency is $1f_H$, said second horizontal scanning frequency is $2f_H$ and said third horizontal scanning frequency is $3f_H$.

14. The system of claim 10, wherein said digital filter comprises a finite impulse response (FIR) filter operated with more input taps in said first operating mode than in said second operating mode.

15. The system of claim 10, wherein said analog filter comprises a passive filter.

16. A distortion correction system, comprising:
means for supplying different numbers of digital distortion correction values;
a digital to analog converter for converting said supplied distortion correction values to an analog distortion correction signal;
an analog low pass filter coupled for receiving said analog distortion correction signal and generating an analog deflection signal, said low pass filter being optimized only for those of said analog deflection signals having a given sample rate;
means for determining a horizontal scanning frequency of an input video signal; and,
control means responsive to said determining means for varying said different numbers of said supplied distortion correction values to maintain said given sample rate of said analog deflection signal for different horizontal scanning rates.

17. The system of claim 16, wherein:
said supplying means supplies distortion correction values and different numbers of interpolated distortion correction values; and,
said control means varies said different numbers of said interpolated distortion correction values to maintain said given sample rate.

18. The system of claim 16, wherein said control means selectively implements a first operating mode for a first horizontal scanning frequency in which none of said interpolated distortion correction values is supplied and a second operating mode for a second horizontal scanning frequency in which a first number of said interpolated distortion correction values is supplied.

19. The system of claim 18, wherein said control means selectively implements a third operating mode for a third horizontal scanning frequency in which a second number of said interpolated distortion correction values is supplied.

20. The system of claim 16, wherein said control means selectively implements a first operating mode for a first horizontal scanning frequency in which a first number of said interpolated distortion correction values is supplied and a second operating mode for a second horizontal scanning frequency in which a second number of said interpolated distortion correction values is supplied.

21. The system of claim 16, wherein said supplying means comprises a switchable digital filter.

22. A method for distortion correction, comprising the steps of:
storing digital distortion correction values;
digitally filtering said digital-distortion correction values in a first mode of operation to generate interpolated distortion correction values;
supplying as an output said distortion correction values together with said interpolated distortion correction values in said first mode of operation;
supplying only said distortion correction values as said output in a second mode of operation;
converting said supplied output to an analog distortion correction signal;
low pass filtering said analog distortion correction signal in each of said operating modes with the same passive analog filter, for generating an analog deflection signal;
determining a horizontal scanning frequency of an input video signal; and,
responsive to said determining step, selecting one of said operating modes for different horizontal scanning frequencies.

23. The method of claim 22, comprising the step of finite impulse response filtering said distortion correction values to generate said interpolated distortion correction values.

24. The method of claim 22, comprising the step of selecting said first operating mode when a first horizontal scanning frequency is identified and selecting said second operating mode when a second horizontal scanning frequency faster than said first horizontal scanning frequency is identified.

25. A method for distortion correction, comprising the steps of:
storing digital distortion correction values;
digitally filtering said digital distortion correction values in a first mode of operation to generate a first number of interpolated distortion correction values;
supplying as an output said distortion correction values together with said first number of interpolated distortion correction values in said first mode of operation;
digitally filtering said digital distortion correction values in a second mode of operation to generate a second number of interpolated distortion correction values;
supplying as said output said distortion correction values together with said second number of interpolated distortion correction values in said second mode of operation;
converting said supplied output to an analog distortion correction signal;
low pass filtering said analog distortion correction signal in each of said operating modes with the same passive analog filter for generating an analog deflection signal;
determining a horizontal scanning frequency of an input video signal; and,
responsive to said determining step, selecting one of said operating modes for different horizontal scanning frequencies.

26. The method of claim 25, comprising the steps of:
finite impulse response filtering said distortion correction values to generate said first number of interpolated distortion correction values in said first operating mode; and,
finite impulse response filtering said distortion correction values to generate said second number of interpolated distortion correction values in said second operating mode.

27. The method of claim 25, comprising the step of generating and supplying more interpolated distortion correction values in said first operating mode than in said second operating mode.

28. The method of claim 27, comprising the step of selecting said first operating mode when a first horizontal scanning frequency is identified and selecting said second operating mode when a second horizontal scanning frequency is identified faster than said first horizontal scanning frequency.

29. The method of claim 25, comprising the step of supplying only said distortion correction values as said output in a third operating mode.

30. The method of claim 29, comprising the step of generating and supplying more interpolated distortion correction values in said first operating mode than in said second operating mode.

31. The method of claim 29, comprising the step of selecting said first operating mode when a first horizontal scanning frequency is identified, selecting said second operating mode when a second horizontal scanning frequency is identified faster than said first horizontal scanning frequency and selecting said third operating mode when a third horizontal scanning frequency is identified faster than said second horizontal scanning frequency.

32. The method of claim 29, comprising the step of finite impulse response filtering with more input taps in said first operating mode than in said second operating mode.

33. A method for distortion correction, comprising the steps of:
supplying different numbers of digital distortion correction values;
converting said supplied digital distortion correction values to an analog distortion correction signal;
analog low pass filtering said analog distortion correction signal with a characteristic response optimized only for those of said analog deflection signals having a given sample rate;
determining a horizontal scanning frequency of an input video signal; and,
varying said different numbers of said supplied distortion correction values to maintain said given sample rate of said analog deflection signal for different horizontal scanning rates.

34. The method of claim 33, comprising the steps of:
supplying distortion correction values and different numbers of interpolated distortion correction values; and,
varying said different numbers of said interpolated distortion correction values to maintain said given sample rate.

35. The method of claim 34, comprising the step of selectively implementing a first operating mode for a first horizontal scanning frequency in which none of said interpolated distortion correction values is supplied and a second operating mode for a second horizontal scanning frequency in which a first number of said interpolated distortion correction values is supplied.

36. The method of claim 35, comprising the step of selectively implementing a third operating mode for a third horizontal scanning frequency in which a second number of said interpolated distortion correction values is supplied.

37. The method of claim 33, comprising the step of selectively implementing a first operating mode for a first horizontal scanning frequency in which a first number of said interpolated distortion correction values is supplied and a second operating mode for a second horizontal scanning frequency in which a second number of said interpolated distortion correction values is supplied.

38. The method of claim 33, comprising the step of generating said interpolated distortion correction values with a switchable digital filter.

* * * * *